(12) United States Patent
Wu et al.

(10) Patent No.: US 9,392,163 B2
(45) Date of Patent: *Jul. 12, 2016

(54) METHOD AND APPARATUS FOR UNATTENDED IMAGE CAPTURE

(71) Applicant: QUALCOMM Incorporated, San Diego, CA (US)

(72) Inventors: Hung-Hsin Wu, San Diego, CA (US); Karthikeyan Shanmugavadivelu, San Diego, CA (US); Shizhong Liu, San Diego, CA (US); Wan Shun Vincent Ma, San Diego, CA (US); Adarsh Abhay Golikeri, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/681,949

(22) Filed: Apr. 8, 2015

(65) Prior Publication Data

US 2015/0215528 A1    Jul. 30, 2015

Related U.S. Application Data

(63) Continuation of application No. 13/612,215, filed on Sep. 12, 2012, now Pat. No. 9,036,069.

(60) Provisional application No. 61/595,423, filed on Feb. 6, 2012.

(51) Int. Cl.
*H04N 5/232* (2006.01)
*G06T 7/00* (2006.01)

(52) U.S. Cl.
CPC ............ *H04N 5/23219* (2013.01); *G06T 7/004* (2013.01); *H04N 5/23222* (2013.01); *G06T 2207/10004* (2013.01); *G06T 2207/30201* (2013.01)

(58) Field of Classification Search
CPC ........... H04N 5/23219; H04N 5/23222; G06T 7/004; G06T 2207/30201; G06T 2207/10004
USPC ............. 348/222.1, 333.01, 333.02; 382/115, 382/118
See application file for complete search history.

(56) References Cited

U.S. PATENT DOCUMENTS 7,668,454 B2    2/2010  Battles et al.
9,036,069 B2 *  5/2015  Wu ..................... H04N 5/23219
                                               348/333.02

(Continued)

FOREIGN PATENT DOCUMENTS

EP    2034722 A1    3/2009
EP    2104338 A2    9/2009

(Continued)

OTHER PUBLICATIONS

International Search Report and Written Opinion—PCT/US2013/023654—ISA/EPO—Jul. 12, 2013.

*Primary Examiner* — Timothy J Henn
(74) *Attorney, Agent, or Firm* — Knobbe, Martens, Olson & Bear LLP

(57) ABSTRACT

Described is a method and apparatus for unattended image capture that can identify subjects or faces within an image captured with an image sensor. The methods and apparatus may then score the image based, at least in part, on scores of detected subjects or faces in the image, scores of facial expressions, a focus score, exposure score, stability score, or audio score. If the score of the image is above a threshold, a snapshot image may be stored to a data store on the imaging device. In some aspects, if the score of the image is below a threshold, one or more audible prompts may be generated indicating that subjects should change positions, smile or remain more still during the image capture process.

15 Claims, 7 Drawing Sheets

(56) References Cited

U.S. PATENT DOCUMENTS

| | | |
|---|---|---|
| 2005/0030388 A1 | 2/2005 | Stavely et al. |
| 2008/0037841 A1 | 2/2008 | Ogawa |
| 2009/0087099 A1* | 4/2009 | Nakamura ......... G06K 9/00281 382/190 |
| 2009/0219406 A1* | 9/2009 | Matsuyama ....... H04N 5/23219 348/222.1 |
| 2009/0231457 A1 | 9/2009 | Lee et al. |
| 2009/0238549 A1 | 9/2009 | Kanayama |
| 2009/0304289 A1* | 12/2009 | Karimoto ............... H04N 5/232 382/224 |
| 2010/0142762 A1* | 6/2010 | Morita .............. G06F 17/30259 382/115 |
| 2010/0245612 A1* | 9/2010 | Ohashi ............... H04N 5/23219 348/222.1 |
| 2011/0115937 A1* | 5/2011 | Sassa ................. G06K 9/00221 348/222.1 |
| 2011/0134269 A1 | 6/2011 | Kim |
| 2011/0228129 A1 | 9/2011 | Miyata |
| 2013/0201359 A1 | 8/2013 | Wu et al. |

FOREIGN PATENT DOCUMENTS

| | | |
|---|---|---|
| JP | 2005003852 A | 1/2005 |
| JP | 2005167789 A | 6/2005 |
| JP | 2008042319 A | 2/2008 |
| JP | 2009071344 A | 4/2009 |
| JP | 2009246832 A | 10/2009 |
| JP | 2010081301 A | 4/2010 |
| KR | 20040017998 A | 3/2004 |

* cited by examiner

METHOD AND APPARATUS FOR UNATTENDED IMAGE CAPTURE

CROSS-REFERENCE TO RELATED APPLICATIONS

This application is a continuation of U.S. application Ser. No. 13/612,215, filed Sep. 12, 2012, entitled "METHOD AND APPARATUS FOR UNATTENDED IMAGE CAPTURE," now U.S. Pat. No. 9,036,069, which claimed priority to U.S. Provisional Patent Application No. 61/595,423 filed Feb. 6, 2012, entitled "METHOD AND APPARATUS TO PROVIDE VOICE PROMPTS WITH A DIGITAL IMAGING DEVICE." Both of these prior applications are assigned to the assignee hereof. The disclosure of these prior applications are considered part of, and are incorporated by reference in, this disclosure.

TECHNICAL FIELD

The present embodiments relate to imaging devices, and in particular, to methods and apparatus for the unattended capture of images with imaging devices.

BACKGROUND

One common use of digital imaging devices is unattended image capture. An unattended image capture mode may be used when all members of a group wish to be included in an image. In this case, no one may be available to attend to the imaging device when an image is captured. This is especially true when the image is captured using a traditional "shutter release" button located on the imaging device. To address this use case, the "self-timer" has become ubiquitous as a feature of digital imaging devices. The self timer provides a delay between when a shutter release is pressed, and an image is captured. This delay provides an opportunity for a photographer to press a shutter release button and then to quickly make their way into the scene being photographed. When the timer expires, the image is captured, regardless of whether the photographer was able to successfully position themselves in the image, and regardless of whether any other subjects of the image were ready when the timer expired.

In addition to the self-timer, some imaging devices provide a remote control capability to assist with unattended image capture. With a remote control capability, there may be less need to use a self timer. Instead, a "photographer" with the remote control can position themselves within a scene being captured by an imaging device. Activating a "shutter release" button on the remote control will remotely command the imaging device to capture an image. If the photographer can position the remote control such that it is not visible in the photograph, remote controls can provide a good solution for unattended image capture.

Unfortunately, there are many problems that can occur when attempting to capture an image with no photographer present behind the camera. This can be at least partly due to the inability of the photographer to preview a scene before an image is captured. Scenes are often dynamic, and may change as subjects of the scene prepare to be photographed. For example, when a photographer first looks through a viewfinder, or initially previews the scene via an electronic display, some subjects may not be properly positioned in the image frame. Additionally, some subjects may not be looking at the camera, or may not have a proper expression to obtain a desirable photograph. However, by waiting for an appropriate moment, the position of the subjects may improve, and the subjects may smile for the camera so that the photographer can obtain a desirable image. The photographer may then capture a snapshot image.

Some photographers may not only wait for the right moment, but instead also provide guidance to the subjects being photographed. For example, the photographer may ask one subject to move closer to another subject, or move more towards the center of the image. The photographer may also coach subjects on their expressions, for example, by asking subjects to smile, and to look at the camera. Then, when the photographer has coached the subjects into a position where the scene being imaged will produce a desirable snapshot, the photographer may capture a snapshot image.

However, a self-timer will not wait for a subject to properly position themselves in a scene, and instead captures an image after a certain amount of time has elapsed. The snapshot is captured regardless of whether all subjects are properly positioned. Capturing a snapshot image using a remote control may allow the "photographer" with the remote control to play some role in directing the subjects, however the photographer's location within the scene may not give him or her a perspective of how the image will appear when captured. This may limit the usefulness of any direction they provide. For example, they may not be able to comment on whether all subjects are properly positioned or whether all subjects of the photograph have a desirable expression.

SUMMARY

Some of the present embodiments may include a method of capturing an image with a digital imaging device. The method includes capturing an image of a scene with an image sensor, determining a plurality of subjects in the image, determining a subject score for each of two or more subjects in the image, determining an image score based, at least in part, on the subject scores, capturing a snapshot image of the scene with the image sensor and storing the snapshot image to a data store if the image score is above a threshold, and outputting a prompt based on the score of a subject if the image score is below a threshold. In some embodiments, the method also includes detecting a face in the captured image. In some embodiments, the method also includes performing facial recognition on the detected face to associate a name with the detected face. In some embodiments, the outputting of a prompt is based on the name.

In some other embodiments, scoring the image is based, at least in part, on a face position score, a face obscuration score, a face blink score, a face smile score, or a face gaze score. In some embodiments, scoring the image is based, at least in part, on an image stability score, an image focus score, an image exposure score, or an image audio score.

In some embodiments, the method includes capturing a snapshot image based on the image score, and storing the snapshot image to a storage. In some embodiments, the method also includes receiving an audio signal from a microphone, detecting keywords or key sounds in the audio signal, and scoring the captured image based on the detected keywords or key sounds.

Another aspect is an apparatus for capturing an image. The apparatus includes an image sensor, and a processor, operatively coupled to the image sensor. The apparatus also includes an image sensor control module, configured to capture an image of a scene with the image sensor, a subject detection module, configured to detect a plurality of subjects in the captured image, a subject scoring module, configured to determine a score for each of two or more of the plurality of subjects detected in the captured image, an image scoring module, configured to determine an image score based, at least in part, on the subject scores, a snapshot capture module, configured to capture a snapshot image with the image sensor if the image score is above a predetermined image score threshold, a prompt determination module, configured to determine a prompt based, at least in part, on the image score, and a user interaction module, configured to output the prompt.

In some embodiments, the apparatus also includes a face recognition module, configured to associate a name with one of the detected subjects, wherein the outputting of the prompt is also based on the name. In some embodiments, scoring the image is based, at least in part, on a face position score, a face obscuration score, a face blink score, a face smile score, or a face gaze score. In some embodiments, scoring the image is based, at least in part, on an image stability score, an image focus score, an image exposure score, or an image audio score.

In some embodiments, the apparatus also includes a microphone, and an audio capture module, configured to capture an audio signal associated with the image using the microphone, wherein the image score is also based on the captured audio signal.

Another aspect disclosed is an image capture device. The image capture device includes a means for capturing an image of a scene with an image sensor, means for determining a plurality of subjects in the image, means for scoring each of two or more of the plurality of subjects, means for scoring the image based, at least in part, on the scores of the subjects, means for capturing an image of the scene with the image sensor and storing the image to a data store if the image score is above a threshold, and a means for outputting a prompt based on the score of a subject if the image score is below a threshold.

In some embodiments, the image capture device further includes a means for capturing audio associated with the image. The image score is further based on the captured audio. In some embodiments, the means for scoring each of the plurality of subjects includes means for determining a face position score, a means for determining a face obscuration score, a means for determining face blink score, a means for determining a face smile score, or a means for determining face gaze score. In some embodiments, the means for scoring the image includes a means for determining an image stability score, a means for determining an image focus score, a means for determining an image exposure score, or a means for determining an image audio score.

Another aspect disclosed is a non-transitory computer readable medium, storing instructions that when executed by a processor, cause the processor to perform the method of capturing an image of a scene with an image sensor, determining a plurality of subjects in the image, scoring two or more of the plurality of subjects, scoring the image based, at least in part, on the scores of the subjects, capturing an image of the scene with the image sensor and storing the image to a data store if the image score is above a threshold, and outputting a prompt based on the score of a subject if the image score is below a threshold.

In some embodiments, scoring the image is based, at least in part, on a face position score, a face obscuration score, a face blink score, a face smile score, a face gaze score, an image stability score, an image focus score, an image exposure score, or an image audio score. In some embodiments, the computer readable medium includes further instructions that when executed extend the method to include detecting a face in the captured image, and performing facial recognition on the detected face to associate a name with the detected face, wherein the outputting of a prompt is based on the name.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

DETAILED DESCRIPTION

Figure 1:
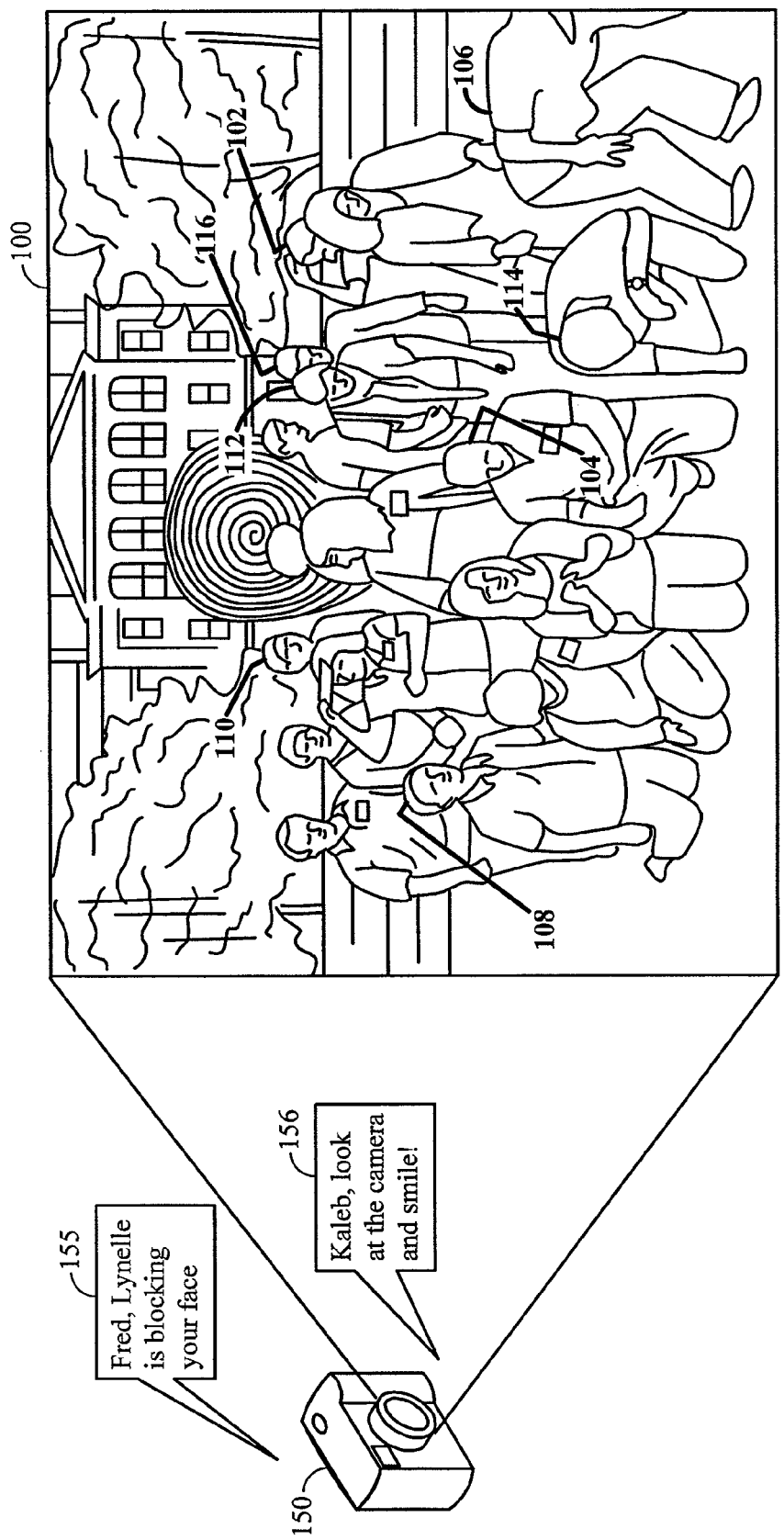
FIG. 1 shows an imaging environment that includes an image of a scene including a plurality of subjects.

Embodiments of the invention relate to methods and apparatus for capturing an image with an imaging device when the imaging device is unattended. In one embodiment, the imaging device includes software and hardware that give guidance to the subjects being photographed via prompting. The prompting may be either visual or auditory prompting, or in some cases both visual and auditory prompting. The system may measure the position or expression of subjects in the scene and then ask subjects recognized in a scene to change their position or facial expression. For example, in one embodiment, the methods and apparatus described below may direct subjects to change positions to better center them in an image frame. In some embodiments, the methods and apparatus may measure the positions of subjects and ensure their entire form or face is part of a captured image. The methods and apparatus may also direct subjects to change their expressions, for example, encouraging them to smile or look at the camera to provide a more desirable photograph.

In one embodiment, the prompting of individual subjects by the imaging device is accomplished using a facial scoring and image scoring process. In some implementations, a preview image of a scene including multiple subjects is captured. The imaging system then detects one or more subjects in the scene captured by the preview image, for example, via a facial detection process. In one implementation, the methods and apparatus then attempt to recognize each face detected in the scene. A database of known faces may be maintained to facilitate the facial recognition. Once the faces have been recognized, each detected or recognized face may be scored on a variety of attributes, including whether the face is blinking, smiling, or gazing. The individual component facial scores of each subject may be combined with other scores relating to the overall preview image to produce an overall image score.

The score for the overall image may be based on multiple component scores gathered from each subject, including the facial scores discussed above, as well as scores relating to attributes of the overall image. These may include scores relating to the exposure of the image, stability of the image, focus of the overall image, or audio associated with the image.

Image quality criteria may be established in some implementations to determine when a snapshot image may be captured. A snapshot image may be different than a preview image. While preview images may be continuously captured in some implementations, preview images are generally not stored to a memory for more than a short, transient period. Image processing methods may be performed on preview images to facilitate tuning imaging parameters such as exposure, aperture, or sensor sensitivity. They may also be displayed to a user of the imaging device on a display to facilitate capture of a snapshot image. A snapshot image may be higher resolution than a preview image in some implementations. A snapshot image may also be stored to a stable storage, such as an internal memory, flash drive, CompactFlash card, Secure Digital & Multimedia Cards, xD picture card, Memory Stick, Microdrive, SmartMedia card, or other stable storage, whereas a preview image is typically not stored to a stable storage.

In some implementations, the snapshot capture quality criteria may include a threshold for the overall image score. In implementations utilizing higher scores to indicate improved characteristics of an image, if the overall image score is above a threshold, the quality of the preview image is determined to be sufficient to produce a desirable snapshot image. In these implementations, a snapshot image may be automatically captured by the imaging device when the overall image score is above a threshold. In some other implementations that utilize lower scores to indicate improved characteristics of an image, if the overall image score is below a threshold, the quality of the previous image may be determined to be sufficient to produce a desirable snapshot image. In these implementations, a snapshot image may be automatically captured by the imaging device when the overall image score is below a threshold.

Other implementations may have more extensive snapshot capture quality criteria. For example, some implementations may include predetermined criteria and/or thresholds for individual components of the image score, including the use of one or more predetermined criteria or thresholds for individual components of the facial scores. Criteria may include determining whether one or more scores are greater than, less than, greater than or equal to, or less than or equal to one or more thresholds. In some embodiments, each individual score may have a corresponding threshold. In other embodiments, multiple scores may utilize the same threshold to determine whether a quality criteria is met. In some implementations, if any of the component scores are below their threshold, a snapshot image may not be captured. Other implementations may measure the percentage of image score components meeting their quality criteria when determining whether to automatically capture a snapshot image. For example, if the percentage of image score components that meet their quality criteria is more than 70%, 75%, 80%, 85%, 90%, 95% or 99%, then the image may be captured.

If the preview image's scores do not meet the snapshot image quality criteria, no snapshot image may be captured by the imaging device. Instead, the component scores of the image may be evaluated against one or more prompting criteria. For example, the scores of each detected face in the preview image may be prioritized based on their negative impact to the overall image score. Subjects with the faces having the highest priority scores may then be selected for prompting.

Prompts may be customized for the selected subjects based on the recognition information determined previously. For example, by recognizing the faces of subjects in the preview image, the imaging system may associate a name to a subject selected for prompting. Thus, the system may perform facial recognition to recognize one of the subjects as "Bob" based on prior data stored on Bob's face. If Bob is found to be one of the subjects, and if at least a portion of their facial component scores are determined to be the highest priority scores, an audio prompt may address them directly, for example, by audibly stating "Smile Bob!" through a speaker integrated with, or attached to, the imaging device.

FIG. 1 shows an imaging environment that includes an image of a scene 100 including a plurality of subjects. As illustrated, some might consider a photograph of this scene to be undesirable. For example, many of the subjects, such as subject 102 and 104, are not looking at the camera. Additionally, subject 106 is not properly positioned in the scene, so much so that his head is outside the scene 100. Furthermore, several of the subjects have expressions that may not create a desirable photograph. For example, subject 108 appears to be gazing into the distance. Subject 110 may be blinking or squinting. Subject 112 and 114 are not looking at the camera. Additionally, subject 112 is partially obscuring subject 116's face.

A camera 150 is illustrated as imaging the scene. The camera 150 is also shown prompting subjects within the scene using auditory prompts 155 and 156. For example, prompt 156 is directed to Kaleb, subject 104, who is currently not looking at the camera. Prompt 155 is directed to Fred, subject 116, whose face is partially blocked by Lynelle, subject 112. As will be discussed in more detail below, an embodiment of the camera 150 includes modules that perform facial recognition on the subjects of the scene, and then compares the recognized faces with a table or database of faces stored within the camera 150. From that table or database, the camera can determine the name of each recognized subject, and then use that information to audibly communicate with each subject.

Figure 2:
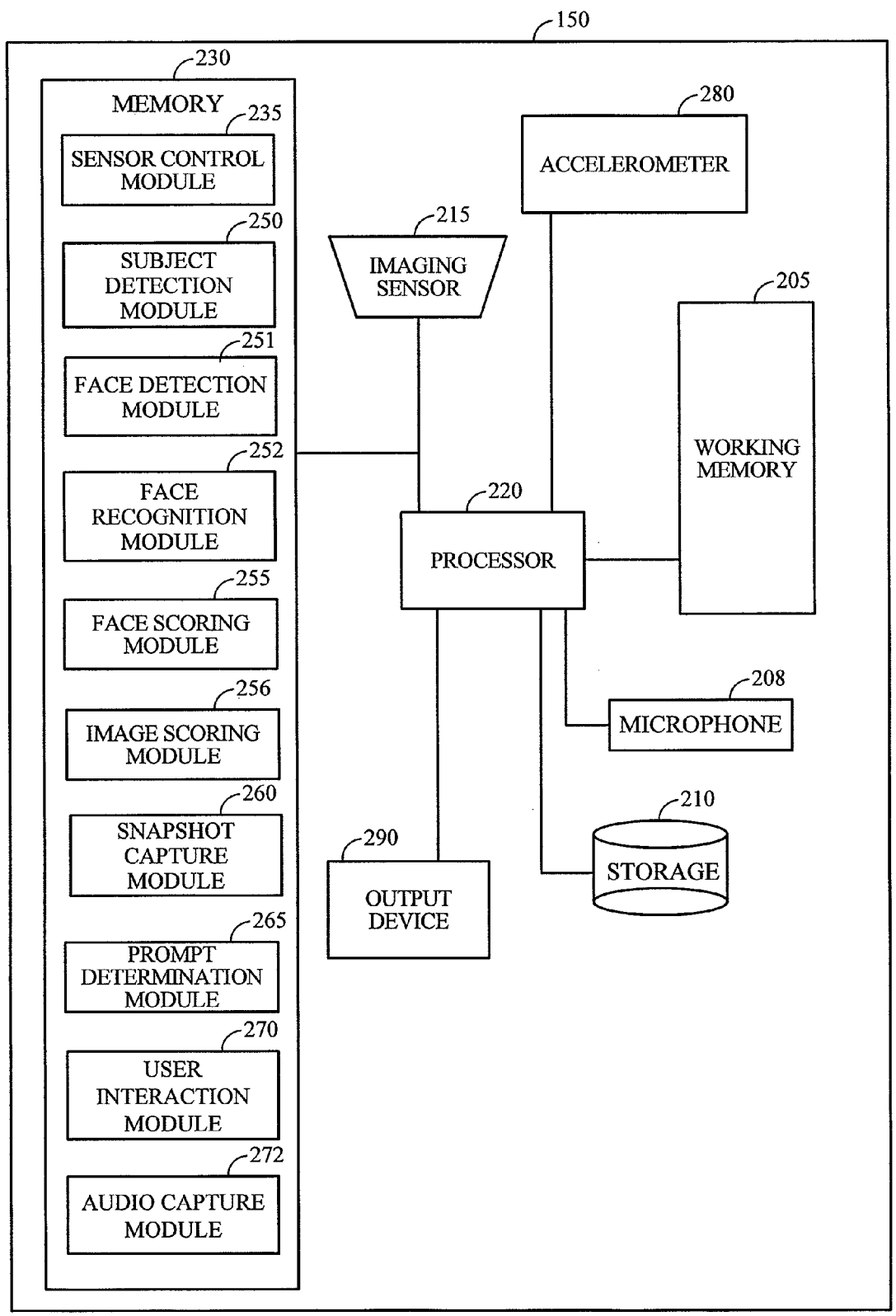
FIG. 2 is a functional block diagram of an imaging device implementing at least one example of the methods and apparatus disclosed.

FIG. 2 is a functional block diagram of the imaging device 150 implementing at least one embodiment of a method used within the imaging device. The imaging device 150 includes a processor 220. The processor 220 is operably connected to an imaging sensor 215, an accelerometer 280, a working memory 205, a microphone 208, a storage 210, an output device 290, and a memory 230.

The memory 230 stores modules that include instructions that configure the processor 220 to perform functions of the imaging device 150. A sensor control module 235 includes instructions that configure the processor 220 to control the imaging sensor 215. For example, instructions in the sensor control module 235 may configure the processor 220 to adjust one or more parameters of the imaging sensor 215, such as the aperture, shutter speed, or sensitivity of the imaging sensor. The sensor control module 235 may also include instructions that cause the processor 220 to command the imaging sensor 215 to capture one or more images. Therefore, instructions in the sensor control module 235 may represent one means for capturing an image of a scene with an image sensor.

A subject detection module 250 includes instructions that configure the processor 220 to detect one or more subjects in an image captured by the imaging sensor 215. In some implementations, the subject detection module may detect objects in an image. Instructions in the subject detection module 250 may therefore represent one means for determining a plurality of subjects in an image. A subject may include a variety of objects. For example, a subject may be a building, an automobile, a human, or an animal such as a horse, dog, cat, or a cow.

A face detection module 251 includes instructions that configure the processor 220 to detect one or more faces in an image captured by the imaging sensor 215. In some implementations, the face detection module 250 may detect faces in subjects or objects detected by the subject detection module 250. In other implementations, the face detection module 251 may operate independently from the subject detection module 250 and detect faces in an image captured by imaging sensor 215 directly.

A face recognition module 252 includes instructions that configure the processor 220 to recognize and identify faces in at least some of the subjects detected by the subject detection module 250 or present in an image captured by imaging sensor 215. The face recognition module 252 may search a database of known faces to perform the recognition function. The database of known faces may be stored in, for example, the storage 210. The face recognition module 252 may also use any of the facial recognition methods known in the art to perform facial recognition.

A face scoring module 255 includes instructions that configure the processor 220 to score each face detected by the face detection module 250 or recognized by the face recognition module 252. The face scoring module 255 may score one or more faces based on whether, for example, the faces are blinking, smiling, or glaring. In an implementation, the face detection module 251 may provide a location of the corners of eyes, a location of eyes, a location of nose holes, and a location of corners of lips. These locations may be treated as "key points." Based on a spatial relation between these key points, the face scoring module 255 may determine a smile degree, a blink degree, or a gaze direction. For example, eye blinking may be determined by measuring the vertical distance between keypoints at the top and bottom of the eyes.

The face scoring module 255 may also score one or more faces based on whether the faces are looking at the camera, or if the faces are partially or fully obscured by other objects within the image. In an embodiment, the face scoring module 255 can determine whether a face is partially obscured by counting how many key points are detected on the face. For example, if only key points of a left eye are detected on a face, the right eye of the face may be obscured. In another implementation, the face scoring module may utilize multiple image frames to score a face. In these implementations, a first face detected in a first frame but not detected in a second subsequent frame may be obscured if a second face is within a threshold proximity of the first face's position in the first frame. In one implementation, a face may be scored based on its position within the image or relative to other subjects or faces.

In one implementation a user may be given a choice as to where they prefer a face to be located within an image frame. In these implementations, a location score may be determined based on a distance of a detected face from the chosen location. Since in some implementations, faces may be detected in subjects detected by the subject detection module 250, instructions in the face scoring module 255 may represent one means for scoring a plurality of subjects. Instructions in the face scoring module 255 may also represent one means for determining a face position score, one means for determining a face obscuration score, one means for determining a face blink score, one means for determining a face smile score, or one means for determining a face gaze score.

An image scoring module 256 includes instructions that configure processor 220 to score an image captured by the imaging sensor 215. An image score may be determined by the instructions in image scoring module 240 based on an image focus, stability, exposure, or the scores of one or more faces detected in the image. The image score may also be based on audio that is captured by the device 150 and associated with the image. For example, instructions in the image scoring module may analyze audio data associated with the image to determine keywords or keysounds. For example, keysounds may include certain audible words or phrases such as "wait," or "take the picture." Keysounds may also include sounds such as the sound of laughter, or the sound of shuffling or movement. A keysound may also be a period of relative quietness. The presence or absence of these keywords or keysounds may then be used to determine an image audio score. For example, some implementations may define one or more keysounds that, when detected, cause an image captured contemporaneously with the detected sound to be scored such that a snapshot of the image is captured by the snapshot capture module 260 (discussed below). For example, the sound of laughter or the detection of a command, such as "take the picture" may trigger a snapshot image to be captured. Similarly, some implementations may define one or more keysounds that cause a contemporaneously captured image to be scored such that a snapshot is inhibited. For example, sounds such as "wait" may inhibit the capture of a snapshot image.

The faces detected in the image may also be subjects in some implementations. Therefore, in some implementations, instructions in the image scoring module 256 may be one means for scoring an image based, at least in part, on at least the scores of two determined subjects. Instructions in the image scoring module 256 may also represent one means for determining an image stability score, one means for determining an image focus score, one means for determining an image exposure score, or a means for determining an audio score.

A snapshot capture module 260 may include instructions that configure the processor 220 to capture a snapshot of a scene based on a snapshot capture quality criteria. For example, in some implementations, the snapshot capture quality criteria may include one or more score thresholds. In some implementations, the image capture module may compare an overall image score of a preview image to a score threshold to determine whether a snapshot image should be captured. If the overall image score of the preview image exceeds the threshold, the image capture module may capture a snapshot image. Therefore, instructions in the snapshot capture module 260 may be one means for capturing a snapshot image of a scene with an image sensor.

In some implementations, the snapshot capture quality criteria may include several component score thresholds. For example, the snapshot capture quality criteria may include one or more of a face smile score threshold, a face position score threshold, a face blink score threshold, a face gaze score threshold, or a face obscuration score threshold. An example of how these scores and threshold may be applied is presented with reference to FIG. 7 below. The snapshot capture module 260 may then compare one or more of these component score thresholds to component scores of a preview image. In some implementations, if any of the component scores indicate a lower quality level than the corresponding component score threshold, the snapshot capture module 260 may not capture a snapshot image. In some other implementations, if the percentage of component scores indicating a lower quality level exceeds a percentage threshold, the snapshot capture module

260 may not capture a snapshot image. In some other implementations, if the number of component scores indicating a lower quality level exceeds a quantity threshold, the snapshot capture module 260 may not capture a snapshot image.

Some other implementations may group component scores into at least two groups. In these implementations, a group of component scores in a first group must exceed their corresponding component score thresholds (discussed above) before the snapshot capture module 260 will capture a snapshot image. The snapshot capture module 260 may also require a number or percentage of the component scores in a second group to exceed their corresponding component score thresholds before a snapshot image is captured.

A prompt determination module 265 includes instructions that configure the processor 220 to determine which prompts should be generated or output by the imaging device 150. The prompt determination module 265 may, for example, prioritize the scores generated by the face scoring module 255 and the image scoring module 256. In some implementations, scores may be prioritized based on the scores' effect on the overall image score determined by image scoring module 256.

A user interaction module 270 may generate or output one or more prompts based on the output of the prompt determination module 265 discussed above. For example, in one implementation, the user interaction module 270 may identify one or more subjects with the highest priority scores as determined by the prompt determination module 265. The user interaction module 270 may then determine the name of these subjects based on facial recognition performed by the face recognition module 252. The name of the subject may then be included in a visual or audio prompt generated or output by the user interaction module 270. The prompt may be designed so as to direct the subject to change their position or facial expression. If the subject follows the direction of the prompt, the overall image score of a new preview image may improve when compared to the preview image used to determine the image scores and facial scores discussed above.

For example, user interaction module 270 may generate or output the prompt by configuring processor 220 to send signals to output device 290. In some implementations, output device 290 may be a speaker, and user interaction module 270 may generate or output audio prompts using output device 290. In some other implementations, output device 290 may be a display, and user interaction module 270 may generate or output visual prompts using output device 290.

In some implementations, the user interaction module may evaluate an image score to determine if it should generate a prompt. Therefore, instructions in the user interaction module 270 may represent one means for outputting a prompt based on the score of a subject if an image score is below a threshold.

An audio capture module 272 includes instructions that configure the processor 220 to capture audio with the microphone 208. The audio captured by the instructions included in the audio capture module 272 may be associated with an image captured by imaging sensor 215 in some implementations. For example, in some implementations, an image may be captured by image sensor 215 at approximately the same time as audio is captured by the audio capture module 272. Therefore, instructions in the audio capture module 272 may represent one means for capturing audio associated with an image.

Figure 3:
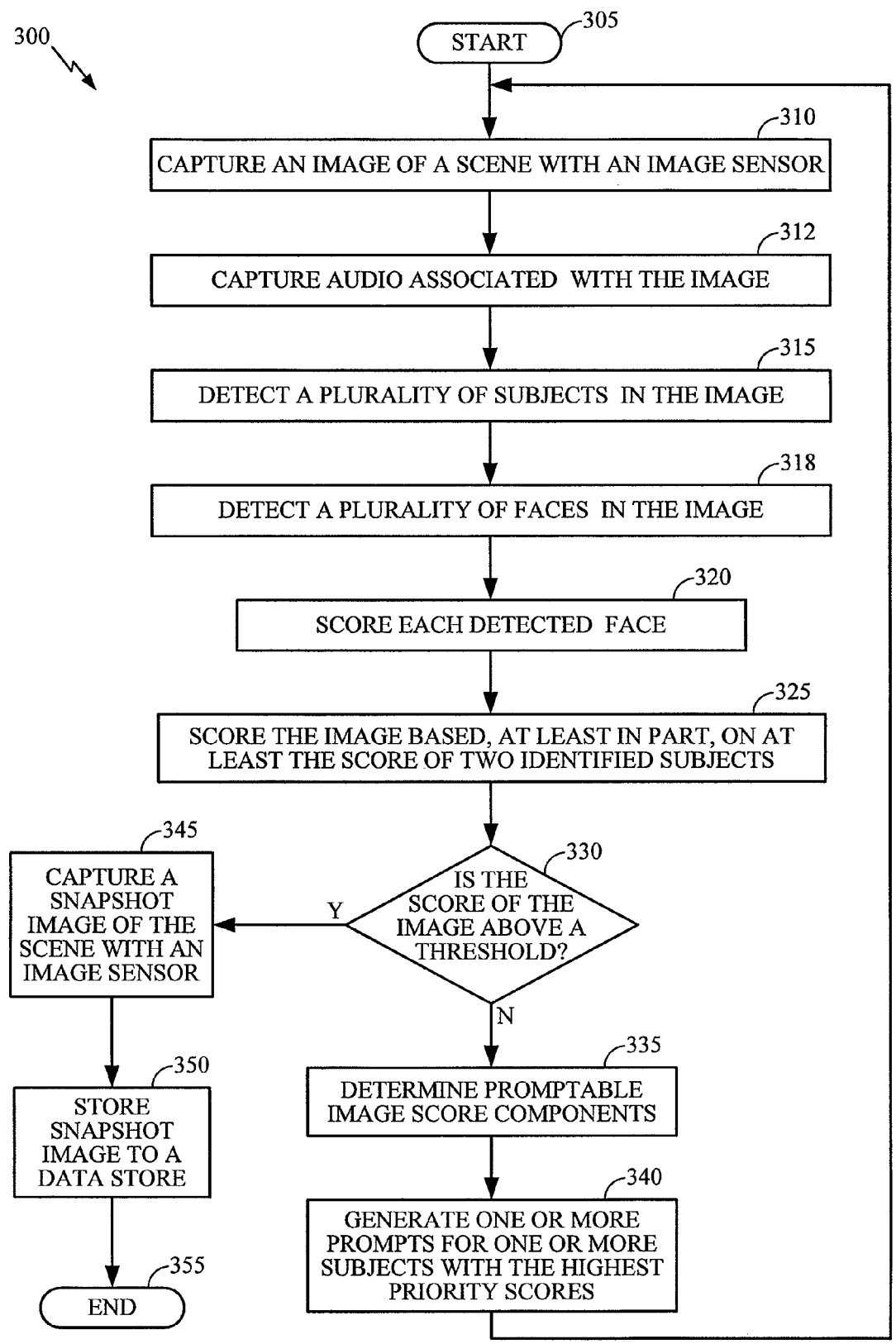
FIG. 3 is a flowchart of one implementation of a method of capturing an image.

FIG. 3 is a flowchart of one implementation of a process 300 of capturing an image. The process 300 may be implemented in one embodiment by the imaging device 150, illustrated in FIG. 2. The process 300 starts at start block 305 and then moves to processing block 310, where an image of a scene is captured with an imaging sensor. In some implementations, processing block 310 may be implemented by instructions included in the image sensor control module 235, illustrated in FIG. 2. Process 300 then moves to processing block 312, where audio associated with the image is captured. In some implementations, an audio signal from a microphone may be captured for a time period before the image is captured in processing block 310. For example, audio may be captured for between 0.5 and 10 seconds before the image is captured in processing block 310. Some implementations may not include a processing block 312.

The process 300 then moves to a processing block 315, where a plurality of subjects in the image are detected. The processing block 315 may be implemented by instructions included in the subject detection module 250, or the face detection module 251, both illustrated in FIG. 2. Process 300 then moves to processing block 318, where a plurality of faces are detected in the image. Block 318 may be implemented by instructions included in the face detection module 251, illustrated in FIG. 2. In some implementations, the functions of processing block 250 and processing block 251 may be combined.

Process 300 then moves to a processing block 320, where the detected faces are scored. Processing block 320 may be implemented by instructions included in the face scoring module 255. In some implementations, detected subjects may include both faces and non-faces.

Several component facial scores may be determined for each detected face in processing block 320. These component scores may relate to, for example, whether the face is blinking, glaring, or smiling. The facial score may also be based, at least in part, on whether the face is looking at the camera or whether the face is partially obscured. Process 300 then moves to block 325, where the image captured in processing block 310 is scored. The image is scored based, at last in part, on at least the score of two identified subjects. Process 300 then moves to decision block 330, which determines whether the image score is above a threshold. Decision block 330 may be implemented by instructions included in the snapshot capture module 260, illustrated in FIG. 2. In some implementations, decision block 330 may be implemented by instructions included in the user interaction module 270, illustrated in FIG. 2.

If the score is above a threshold, process 300 moves to processing block 345, where a snapshot image of the scene is captured with an image sensor. Processing block 345 may be implemented by instructions included in the image capture module 260, illustrated in FIG. 2. In some implementations, the image captured in processing block 310 may have a first resolution and the image captured in processing block 345 may have a second resolution that is higher than the first resolution. For example, in some implementations, the image captured in processing block 310 may be considered a preview image, and the image captured in processing block 345 may be considered a snapshot image. After the image is captured in block 345, process 300 moves to processing block 350, where the image is stored to a data store. Process 300 then moves to end block 355.

While decision block 330 is illustrated comparing the image score determined in block 325 to a threshold, other implementations may differ in their evaluation of scores when determining whether to move to processing block 345 or processing block 335. For example, some implementations may compare the component scores determined in block 320 or 325 to one or more thresholds defined for and corresponding to each component score. If any score is below its corresponding threshold, process 300 in these implementations may move to block 335 from decision block 330.

In the illustrated implementation, if the image score determined in processing block 325 is not above the threshold, process 300 moves to processing block 335, where promptable image score components are determined. Promptable image score components may be a subset of all component scores upon which the overall image score is based. In some implementations, some component scores may not be improvable via the generation of prompts. For example, if an image score is based, at least in part, on an image focus score, generation of a prompt may not improve the focus of the image. In these implementations, the component image focus score may not be considered a promptable image score component.

Processing block 335 may be implemented by instructions included in the prompt determination module 265, illustrated in FIG. 2. Processing block 335 may also prioritize the promptable image score components, for example, based on their effect on the image score determined in block 325. For example, in some implementations, a promptable image score component's effect on the image score may be a function of the score, and one or more weights assigned to the image score component.

Process 300 then moves to processing block 340, where one or more prompts are generated or output for subjects with the highest priority component scores. Processing block 340 may be implemented by instructions included in the user interaction module 270. The prompts generated in processing block 340 may be audio or visual prompts, generated, for example, by a speaker or electronic display. After the prompts are generated or output in processing block 340, process 300 returns to processing block 310 and another image is captured. Process then repeats as described above.

Figure 4:
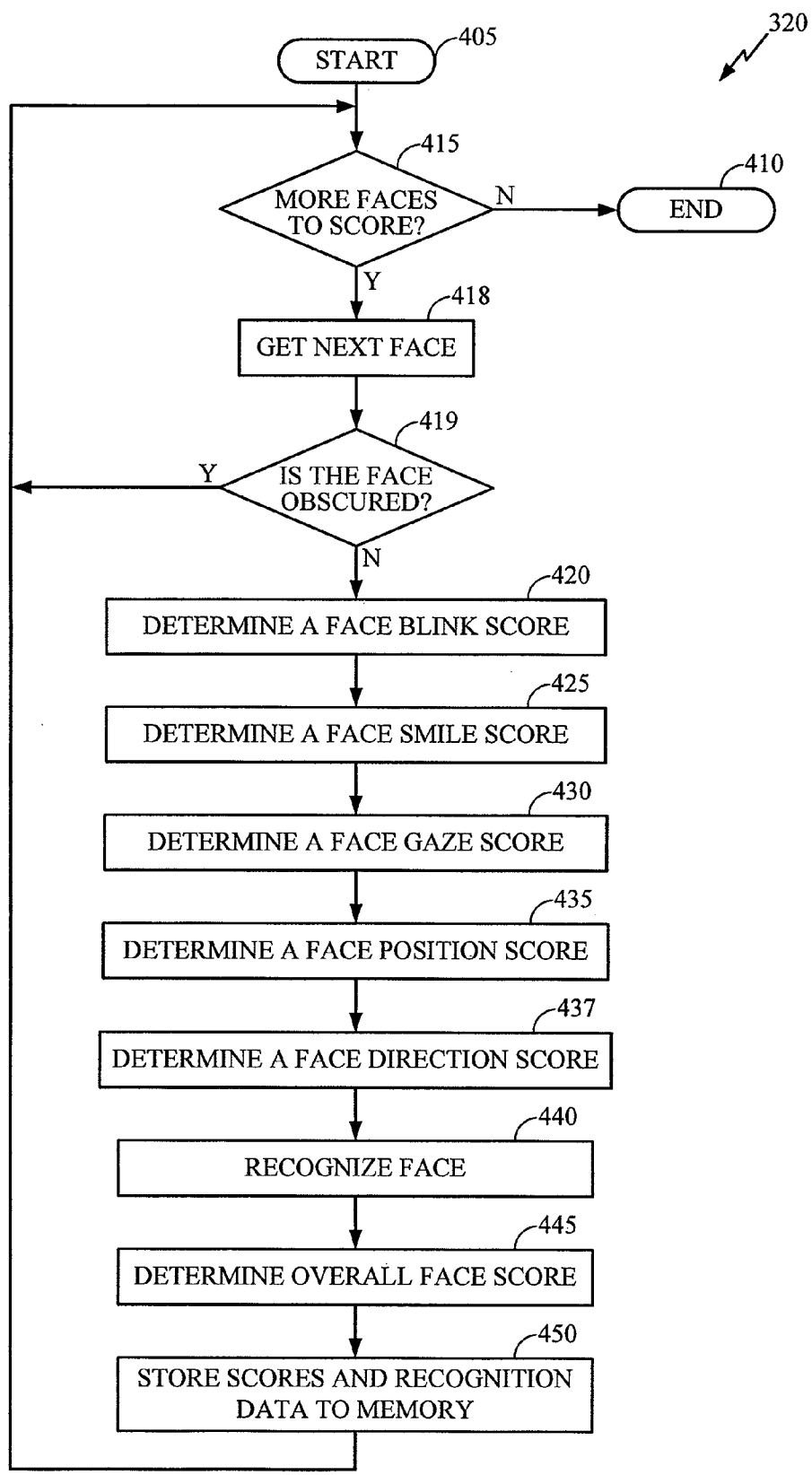
FIG. 4 is a flowchart illustrating one implementation of a method for scoring one or more identified faces.

FIG. 4 is a flowchart illustrating one implementation of a method for scoring one or more identified faces. Process 320 may be implemented by instructions included in the face scoring module 255, illustrated in FIG. 2. Process 320 begins at start block 405 and then moves to decision block 415 where it determines whether more faces need to be scored. If no faces need to be scored, process 320 moves to end block 410. If more faces do need to be scored, process 320 moves to block 418 where the next face to be scored is obtained. In decision block 419, the face is evaluated to determine if it is obscured. If the face is obscured, it may not be able to be properly evaluated with regards to blinking, smiling, gazing, or gaze direction. If the face is obscured, process 320 returns to decision block 415. In the face is not obscured, process 320 then moves to processing block 420 where a face blink score is determined. For example, if the face appears to be blinking, the score determined in block 420 may be a negative score. If the face does not appear to be blinking, for example, the eyes are wide open, the score determined in block 420 may be a positive score. Any of the methods of blink detection known in the art may be implemented in processing block 420. For example, just as a smile degree may be calculated based on the distance between keypoints representing four corners of a mouth in a detected face a blink score may also be based on similar measurements of the distances of key points representing the upper and lower portions of eyes of a detected face.

After a face blink score is determined in block 420, process 320 moves to processing block 425, where a face smile score is determined. In some implementations, a face that is frowning may be assigned a negative smile score and a face that is smiling may be assigned a positive smile score. Any of the methods of smile detection known in the art may be used to implement processing block 425. After the face smile score is determined, process 320 moves to processing block 430, where a face gaze score is determined. A face that is determined to be gazing may receive a negative score in processing block 430 while a face with a non-gazed expression may receive a positive gaze score. Any of the methods of face gaze detection known in the art may be used to implement processing block 430.

Process 320 then moves to block 435, where a face position score is determined. For example, the face position score may be based on, for example, how close the face is to other faces. A face position score based on proximity to other faces may be used by the user interaction module to ensure subjects in an image are grouped together in the image. In some implementations, the face position score may also be based on how close the face is to the edge of the image of the scene being captured. Faces within a threshold distance from the edge of the image frame may receive a negative face position score while faces closer to the center of the image may receive a positive face position score.

Process 320 then moves to processing block 437, where a face direction score is determined. The face direction score may be based on how directly the face is determined to be looking in the direction of the imaging sensor capturing the image. A face determined to be looking directly at the imaging sensor may receive a high face direction score while a face determined to be looking away from the camera may receive a lower or negative face direction score.

In an implementation, a gaze direction may be calculated based on the distribution between key points of the eye, including keypoints located at the bottom, top, left, right corners of the eye, along with the eyeball or pupil. Based on the distance between the eyeball or pupil and the four corners of the eye, a gaze direction may be determined.

The process 320 then moves to a processing block 440 to attempt to recognize the face. Face recognition may be based, in some implementations, on a face recognition database that maps facial attributes or identifiers within the captured image to names of individuals stored in the imaging device. The names may be the formal or informal names of individuals, as entered into a configuration interface on the imaging device. The face recognition database may be preconfigured by a user and stored in a storage, such as storage 210 illustrated in FIG. 2. The face recognition of processing block 440 may also use any of the facial recognition methods known in the art.

Process 320 then moves to block 445 where the face is scored. In the illustrated implementation, a face is scored based on one or more "component" face scores. In process 320, the component face scores are the face blink score, face gaze score, face position score, face obscuration score, and the face direction score. In some implementations, a weighted average of these component scores may be used to determine the face score. Alternatively, certain thresholds may be established by the user, or preset in the device, for each component score described above. Any component score lower than its corresponding "acceptable" threshold may be assigned a proportionately higher weight than other scores. This may result in a negative or unacceptable face score for any face with a component score lower than its corresponding "acceptable" threshold. In processing block 450, the face scores and recognition data, such as an identity of the face, are stored to a memory. The memory may be a storage, such as storage 210 illustrated in FIG. 2, or a memory, such as working memory 205 illustrated in FIG. 2. The recognition data stored in processing block 450 may include the name or other identifying information of faces recognized in processing block 440. Process 320 then returns to decision block 415.

Not all of the processing blocks illustrated in FIG. 4 may be present in all implementations. For example, some implementations may not include one or more of processing blocks 420, 425, 430, 435, 436, 437, 440, or 445. Additionally, while the illustrated implementation of FIG. 4 shows a processing order, for example, with processing block 420 before processing block 425, other implementations may perform the functions of the processing blocks of FIG. 4 in a different order than that illustrated.

Figure 5:
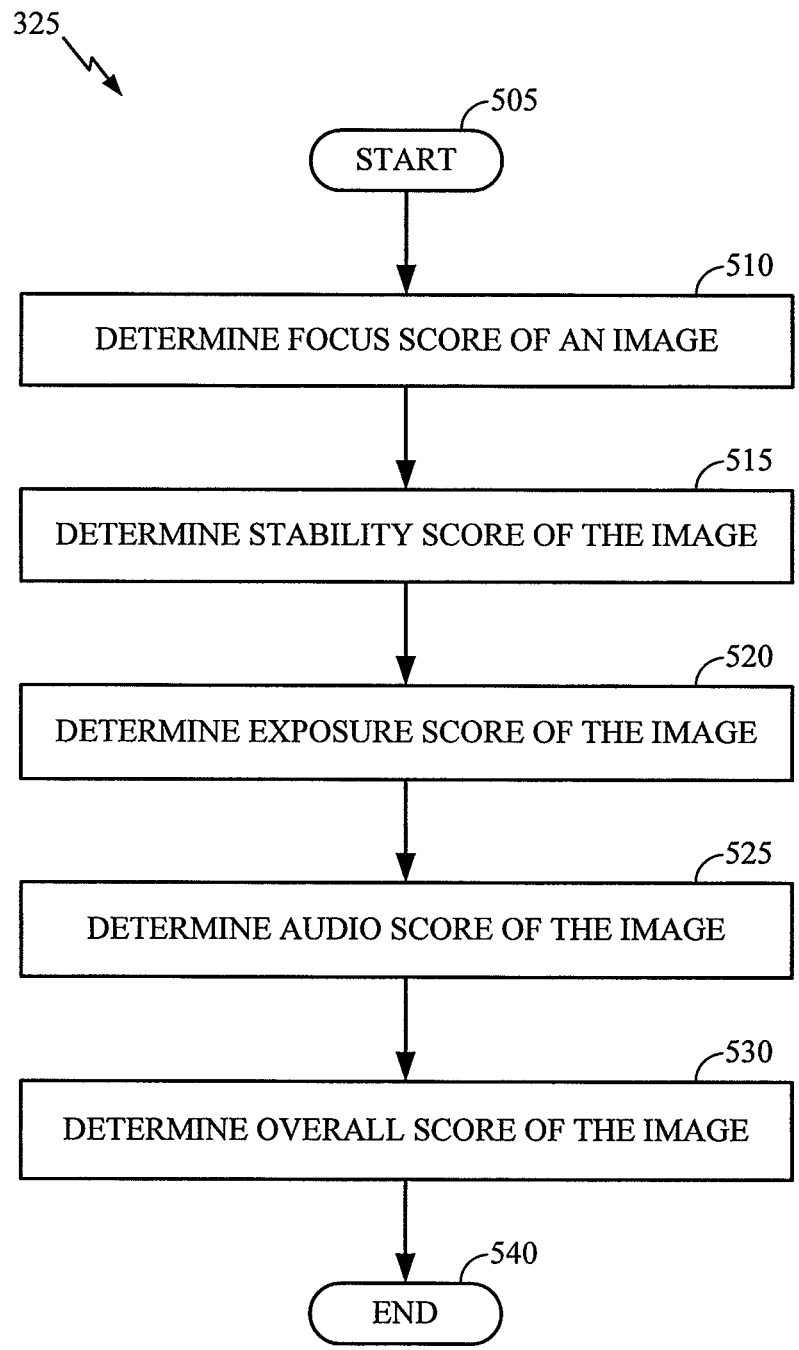
FIG. 5 is a flowchart of one implementation of a method for scoring an image.

FIG. 5 is a flowchart of one implementation of a method for scoring an image. Process 325 may be implemented by instructions included in the image scoring module 256, illustrated in FIG. 2. Process 325 begins at start block 505 and then moves to block 510, where a focus score of the image is determined. In some implementations, the focus score may be based on the sharpness of the image. In some other implementations, regions of interest in the image may be detected, and the focus score based on the sharpness in one or more of the regions of interest. Other methods of evaluating the focus of an image known in the art may be used to implement processing block 510. Process 325 then moves to block 515, where a stability score for the image is determined. The stability score of the image may be based, in some implementations, on the amount of blur present in the image. Process 325 then moves to processing block 520, where an exposure score is determined for the image. In some implementations, the exposure score may be based on the number of pixel values above a first threshold and the number of pixel values below a second threshold.

Process 325 then moves to processing block 525, where an audio score for the image is determined. Processing block 525 may analyze audio data associated with the image. For example, an audio signal may be captured at approximately the same time as the image was captured. Analysis of the audio in processing block 525 may detect or recognize one or more characteristics, keywords, or key sounds of the audio signal. For example, the presence or absence of laughter, talking, silence, running or walking may be used to determine an audio score for the image in processing block 525. Note that some implementations may not include the determination of an audio score in the determination of an overall score for an image.

In processing block 530, the image is scored. In some implementations, the image score may be a weighted average score of the scores determined in processing blocks 510-525. In other implementations, the image score may also be based on face scores determined by process 320, illustrated in FIG. 4. Process 325 then moves to end block 540.

Not all of the processing blocks illustrated in FIG. 5 may be present in all implementations. For example, some implementations may not include one or more of processing blocks 510, 515, 520, or 525. Additionally, while the processing blocks of FIG. 5 are shown in FIG. 5 and discussed above in a particular order, the order of the processing blocks may be different in other implementations. For example, while FIG. 5 shows processing block 510 before processing block 515, other implementations may perform processing block 515 before processing block 510. The order of other processing blocks may also be different in other implementations.

Figure 6:
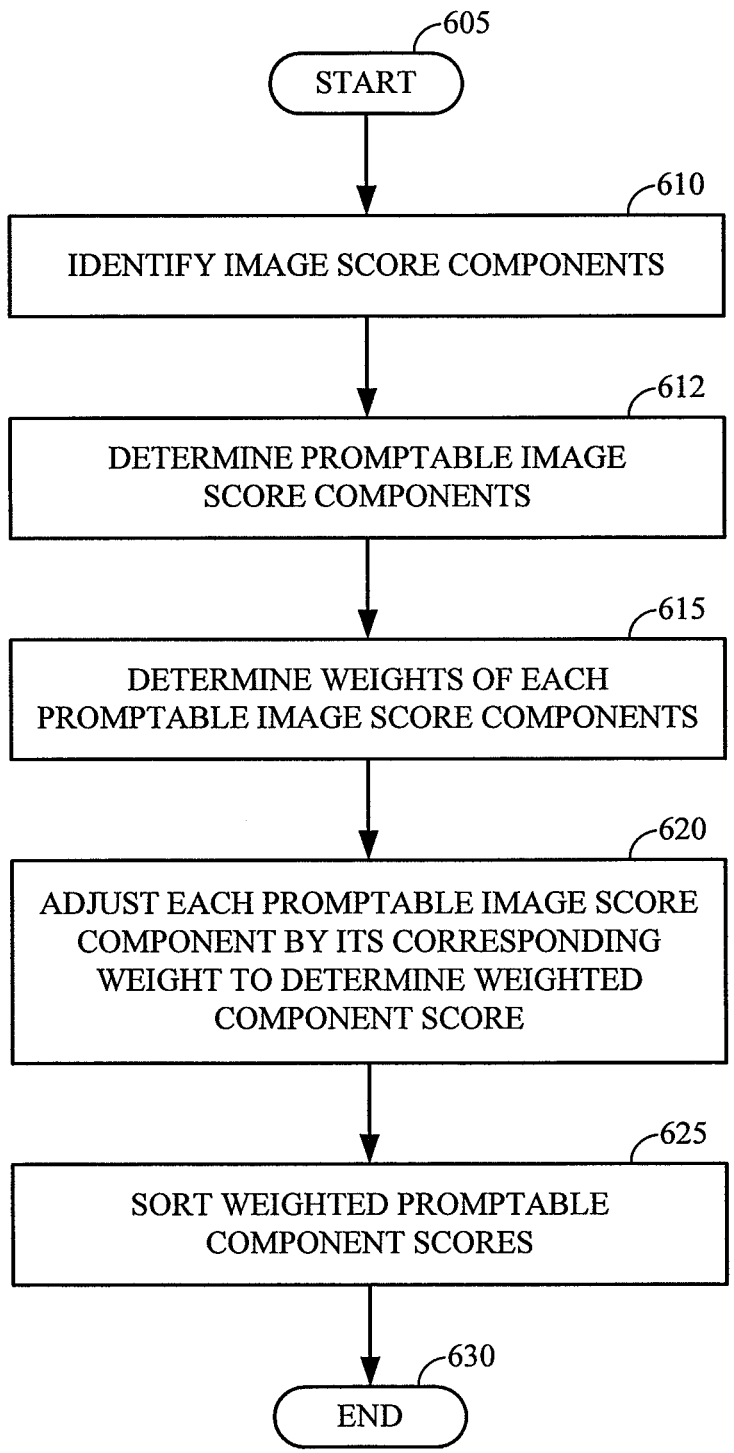
FIG. 6 is a flowchart of one implementation of a method for prioritizing promptable image score components.

FIG. 6 is a flowchart of one implementation of a method for prioritizing promptable image score components. Process 335 may be implemented by instructions included in the score prioritization module 265, illustrated in FIG. 2. Process 335 begins at start block 605 and then moves to block 610, where image score components are identified. Image score components identified in block 610 may be any of the image score components determined in process 325 of FIG. 5 or process 320 of FIG. 4. Process 335 then moves to processing block 612, where the promptable image score components are determined. In some implementations, not all of the image score components may be improved by generation or outputting of a visual or audio prompt. For example, in some implementations, an image focus score may not improve by generating a prompt.

In processing block 615, weights for each promptable image score component is determined. In some implementations, the weights of each promptable image score may be determined base on the relative importance of the score component to a satisfactory photograph. For example, some implementations may be designed such that a subject of the image that is looking away from the camera is considered more important than a subject of the image that is blinking. In these implementations, the weight assigned to the face direction score determined in processing block 437 of process 320 of FIG. 4 may be larger than the weight assigned to the blink score determined in processing block 420 of process 320. Similarly, some implementations may be designed assuming that a blinking subject represents a transient condition and therefore the blink score may be assigned a lower weight than other scores that may be judged to represent more stable conditions, such as a face obscuration score or face position score.

In processing block 620, each promptable image score is adjusted based on its corresponding weight determined in processing block 615. In block 625, the weighted scores are sorted. Process 335 then moves to end block 630 and terminates.

Not all of the processing blocks illustrated in FIG. 6 may be present in all implementations. For example, some implementations may not include one or more of processing blocks 612, 615 or 620. Additionally, while the processing blocks of FIG. 6 are shown in FIG. 6 and discussed above in a particular order, the order of the processing blocks may be different in other implementations. For example, while FIG. 6 shows processing block 612 before processing block 615, other implementations may perform processing block 615 before processing block 612. The order of other processing blocks may also be different in other implementations.

Figure 7:
FIG. 7 shows an imaging environment that includes an image of a scene including a plurality of subjects.

FIG. 7 shows an image of a scene including a plurality of subjects. Table 1 below illustrates one implementation's component scores for detected subjects in the image 100 of FIG. 7.

TABLE 1

| (1) | (2) Item # | (3) Name | (4) Smile Score | (5) Gaze Score | (6) Position Score | (7) Direction Score) |
|---|---|---|---|---|---|---|
| Subject 1 | 116 | Fred | 10 | 0 | 40 | −20 |
| Subject 2 | 112 | Lynelle | 15 | 0 | 40 | −30 |
| Subject 3 | 104 | Kaleb | 15 | 0 | 50 | −20 |
| Subject 4 | 114 | Kalin | 0 | 0 | 40 | −50 |
| Subject 5 | 106 | Vikas | 0 | 0 | 0 | 0 |
| Subject 6 | 108 | Unknown | 25 | −50 | 20 | 20 |
| Subject 7 | 118 | | | | 40 | |
| Subject 8 | 110 | Unknown | −10 | 0 | 0 | 0 |

Table 1 illustrates that several subjects have been detected by the imaging device. These subjects may have been detected by instructions included in a subject detection module 250, illustrated in FIG. 2, as one example. These subjects are listed in column 1. Column 2 of Table 1 identifies the subjects by listing their identification numbers in FIG. 7.

Column 3 lists a name of a subject if known by the implementation. For example, the subjects listed in column 1 may have been identified by a face recognition module 252 of FIG. 2. As a result, the names of at least some of the subjects are known. In some implementations, names may be generated by the implementation. For example, some implementations may generate a name based on the subject's position in the image. For example, in an image that includes four subjects, an implementation may generate names such as "subject on the top left,", "subject on the bottom left," "subject on the top right," and subject on the bottom right."

Other subjects shown in Table 1 do not have a name, for example, subjects 6 and 7. Subject 6, item 108, has a detected face, and thus has component scores associated with a face. Subject 7 does not have a detected face, and thus does not include component scores relevant to detected faces, such as columns 4-6, and 8. Columns 4-7 represent component scores for smile, gaze, position, and direction for each of the detected subjects. The scores in the illustrated implementation relate to the relative desirability of at least one attribute of the subjects identified in column 1. In the illustrated implementation, a component score above zero (0) is considered acceptable. In this implementation, if all component scores are above zero, a snapshot image may be automatically captured, for example, by a snapshot capture module 260, illustrated in FIG. 2. In some implementations, capturing a snapshot image may comprise saving an image to a memory buffer. Negative scores may prevent a snapshot image from being automatically captured.

Because some of the component scores are below zero, a snapshot image may not be automatically captured by the illustrated implementation. Instead, the component scores of Table 1 may be prioritized to determine promptable component image scores. Such a prioritization may be performed in some implementations using data similar to Table 2 below.

TABLE 2

|     | Subject   | Ref. # | Score Type | Score | Weight | Weighted Score |
|-----|-----------|--------|------------|-------|--------|----------------|
| (1) | Subject 2 | 112    | Direction  | −30   | 2      | −60            |
| (2) | Subject 3 | 104    | Direction  | −20   | 2      | −40            |
| (3) | Subject 8 | 110    | Smile      | −10   | 1      | −10            |

Table 2 illustrates a portion of the component scores from Table 1 after they are prioritized. The prioritization may be based on a weighted score derived from the component score and an assigned weight. The prioritization is shown by the order in the table, with the rows of the table ordered from highest priority subjects and scores, in row 1, to lower priority subjects and scores. In some implementations, the weight may be assigned based on the score type. Other implementations may have other methods of assigning a weight to a component score.

The direction score of Lynelle, subject 2, Reference 112 has been prioritized highest in the illustrated implementation. As shown in preview image 100 of FIG. 7, Lynelle's face 112 is looking down such that it is barely discernible in the preview image 100. Next in priority is subject 2, Reference 104, Kaleb, who is also looking down such that his face cannot be readily observed in the image. Note that this implementation prioritized Kaleb because his direction score was low, as shown by the "score type" column, whereas subject 8, Reference 110, was prioritized lower than Kaleb. While subject 8 had a low smile score, its weight was lower than the direction score weight, resulting in a lower priority than either Lynelle or Kaleb.

Some implementations may then generate one or more prompts based on the prioritized scores. These implementations may start generating prompts with the highest priority score. For example, the implementation utilizing Table 2 above may generate a first prompt based on the obscuration score of Vikas in row 1. Some implementations may generate more than one prompt as a result of the analysis described above. For example, the implementation utilizing Table 2 above may generate a second prompt based on the direction score of Kaleb in row 2. Some implementations may generate additional prompts, for example, 3, 4, or 5 prompts as a result of the analysis. Some implementations may then wait a period of time before performing the analysis again, to allow time for subjects to react to the prompts provided.

To select the prompts, an implementation may utilize a data structure similar to Table 3 below:

TABLE 3

| Score Type | Prompt |
|------------|--------|
| Direction  | "%s please look at the camera" |
| Smile      | "%s, smile for the camera!" |
| Gaze       | "%s, please look here and smile!" |

Table 3 is provided only as a simple illustration of how prompts may be determined based on the type of scores provided in Table 2. Once the highest priority scores are selected for prompting using Table 2, a prompt may be generated by matching the score type of a selected score in Table 2 with the score type in Table 3. The prompt is shown as a string, including a string substitution "% s" to identify the subject. Some implementations may substitute the name field of Table 1 with the string substitutions shown in the prompt field of Table 3. A text to speech capability as is known in the art may then generate an audio prompt based on the prompt column of Table 3. Alternatively, some implementations may store audio files internally, and play the audio files, when generating one or more prompts.

The technology is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, processor-based systems, programmable consumer electronics, network PCs, minicomputers, mainframe computers, distributed computing environments that include any of the above systems or devices, and the like.

As used herein, instructions refer to computer-implemented steps for processing information in the system. Instructions can be implemented in software, firmware or hardware and include any type of programmed step undertaken by components of the system.

A processor may be any conventional general purpose single- or multi-chip processor such as a Pentium® processor, a Pentium® Pro processor, a 8051 processor, a MIPS® processor, a Power PC® processor, or an Alpha® processor. In addition, the processor may be any conventional special purpose processor such as a digital signal processor or a graphics processor. The processor typically has conventional address lines, conventional data lines, and one or more conventional control lines.

The system is comprised of various modules as discussed in detail. As can be appreciated by one of ordinary skill in the art, each of the modules comprises various sub-routines, procedures, definitional statements and macros. Each of the modules are typically separately compiled and linked into a single executable program. Therefore, the description of each of the modules is used for convenience to describe the functionality of the preferred system. Thus, the processes that are undergone by each of the modules may be arbitrarily redistributed to one of the other modules, combined together in a single module, or made available in, for example, a shareable dynamic link library.

The system may be used in connection with various operating systems such as Linux®, UNIX® or Microsoft Windows®.

The system may be written in any conventional programming language such as C, C++, BASIC, Pascal, or Java, and ran under a conventional operating system. C, C++, BASIC, Pascal, Java, and FORTRAN are industry standard programming languages for which many commercial compilers can be used to create executable code. The system may also be written using interpreted languages such as Perl, Python or Ruby.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In one or more example embodiments, the functions and methods described may be implemented in hardware, software, or firmware executed on a processor, or any combination thereof. If implemented in software, the functions may be stored on or transmitted over as one or more instructions or code on a computer-readable medium. Computer-readable media include both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The foregoing description details certain embodiments of the systems, devices, and methods disclosed herein. It will be appreciated, however, that no matter how detailed the foregoing appears in text, the systems, devices, and methods can be practiced in many ways. As is also stated above, it should be noted that the use of particular terminology when describing certain features or aspects of the invention should not be taken to imply that the terminology is being re-defined herein to be restricted to including any specific characteristics of the features or aspects of the technology with which that terminology is associated.

It will be appreciated by those skilled in the art that various modifications and changes may be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment can be included with other depicted embodiments in any combination. For example, any of the various components described herein and/or depicted in the Figures may be combined, interchanged or excluded from other embodiments.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting.

We claim:

1. A method of capturing an image, comprising:
    obtaining an image of a subject having a face from an imaging sensor;
    determining, via an electronic processing circuit, a subject score for the subject in the image based on a position of the face of the subject;
    detemining, via the electronic processing circuit, an image score based, at least in part, on the subject score; and
    capturing, via the electronic processing circuit, an image and storing the image to a data store in response to the image score being above a threshold;
    determining, via the electronic processing circuit, promptable image score components of at least two subjects in the image;
    prioritizing, via the electronic processing circuit, the promptable image score components of the at least two subjects; and
    outputting, via the electronic processing circuit, a prompt based on the prioritized promptable image score components in response to the image score being below a threshold.

2. The method of claim 1, further comprising scoring the image based, at least in part, on a face gaze score.

3. The method of claim 1, wherein scoring the image is further based, at least in part, on a face obscuration score.

4. The method of claim 1, further comprising determining a face position score based on a proximity of a face of the subject to a center of the image, and determining the image score based at least in part on the face position score.

5. The method of claim 1, further comprising determining a face position score based on a proximity of the subject's face to a second detected face.

6. An apparatus for capturing an image, comprising:
    an electronic processor;
    an image sensor, operably connected to the electronic processor; and
    an electronic memory, operably connected to the electronic processor, and storing:
        a sensor control module comprising instructions that configure the electronic processor to obtain an image of a subject having a face via the image sensor,
        a subject scoring module comprising instructions that configure the electronic processor, to determine a score for a subject in an image based on a proximity of a detected face of the subject to one or more other faces in the image,
        an image scoring module comprising instructions that configure the electronic processor to determine an image score based, at least in part, on the subject score,
        a face recognition module comprising, instructions that configure the electronic processor to associate a name with the detected subject,
        a prompt determination module comprising instructions that configure the electronic processor to determine an audio prompt in response to the image score and the associated name,
        user interaction module comprising instructions that configure the electronic processor to output the audio prompt, and
        a snapshot capture module comprising instructions that configure the electronic processor, to capture a snapshot image in response to the image score being above a predetermined image score threshold.

7. The apparatus of claim 6, wherein the electronic memory further stores a face scoring module comprising instructions that configure the electronic processor to determine a face position score based on a proximity of the subject's face to a second detected face, and wherein the image scoring module further comprises instructions that configure the electronic processor to determine the image score based on the face position score.

8. The apparatus of claim 6, wherein the electronic memory further stores a face scoring module comprising instructions that configure the electronic processor to determine a face direction score based on a distribution of key points of an eye of the subject, and wherein the image scoring module further comprises instructions that configure the electronic processor to determine the image score based on the face direction score.

9. The apparatus of claim 8, wherein the face scoring module further comprises instructions that configure the electronic processor to determine the face direction score further based on a distance between a pupil of an eye and four corners of the eye.

10. An image capture device for capturing an image, comprising:
    means for obtaining an image of a subject having a face;
    means for determining a face obscuration score, configured to generate a face obscuration score of the face of the subject;
    means for determining a face gaze score, configured to generate a face gaze score of the face of the subject,
    means for scoring each of a plurality of detected subjects in an image based on a respective position of each of the subjects within the image, the face obscuration score, and the face gaze score;
    means for scoring the image based, at least in part, on the scores of the subjects; and means for capturing an image of the scene and storing the image to a data store if the image score is above a threshold.

11. The image capture device of claim 10, further comprising means for outputting a prompt in response to the image score being below a threshold.

12. The image capture device of claim 10, further comprising means for capturing audio associated with the image, wherein the image score is further based on the captured audio.

13. The image capture device of claim 10, wherein the means for scoring the image is configured to score the image based on one or more of a stability of the image, a focus of the image, an exposure of the image, and audio captured contemporaneously with the image.

14. A non-transitory computer readable storage medium comprising instructions that when executed, cause a processor to capture an image, the medium comprising instructions for:
   obtaining an image of a subject having a face from an image sensor;
   scoring a plurality of subjects detected in the image, wherein a score of each subject is based on a relative position of the subject's face;
   scoring the image based, at least in part, on the scores of the subjects;
   capturing an image of the scene and storing the image to a data store in response to the image score being above a threshold;
   determining promptable image score components of at least two subjects in the image;
   prioritizing the promptable image score components of the at least two subjects; and
   outputting a prompt based on the prioritized promptable image score components in response to the image score being below a threshold.

15. The computer readable medium of claim 14, the medium further comprising instructions for scoring the image based, at least in part, on a face obscuration score, wherein the face obscuration score is based on a number of key points detected on the face.

* * * * *